(12) United States Patent
Kim et al.

(10) Patent No.: US 11,255,413 B2
(45) Date of Patent: Feb. 22, 2022

(54) POWER TRAIN FOR ELECTRIC VEHICLE

(71) Applicants: Hyundai Motor Company, Seoul (KR); Kia Motors Corporation, Seoul (KR)

(72) Inventors: Jong Sung Kim, Incheon (KR); Jin Ho Kim, Suwon-si (KR); Jae Joon Lee, Anyang-si (KR); Jong Sool Park, Hwaseong-si (KR); Jin Young Hwang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/993,436

(22) Filed: Aug. 14, 2020

(65) Prior Publication Data
US 2021/0301905 A1 Sep. 30, 2021

(51) Int. Cl.
*F16H 1/32* (2006.01)
*H02K 7/108* (2006.01)
*F16H 3/72* (2006.01)
*B60K 1/02* (2006.01)
*B60K 17/06* (2006.01)
*F16H 37/06* (2006.01)
*B60K 17/22* (2006.01)

(52) U.S. Cl.
CPC ............ *F16H 3/725* (2013.01); *B60K 1/02* (2013.01); *B60K 17/06* (2013.01); *B60K 17/22* (2013.01); *F16H 37/065* (2013.01); *F16H 2200/0021* (2013.01); *F16H 2200/2005* (2013.01); *F16H 2200/2033* (2013.01)

(58) Field of Classification Search
CPC .... F16H 63/727; F16H 3/728; F16H 637/065; F16H 637/046; F16H 2037/047; F16H 2200/2033; F16H 2200/2035; F16H 2200/2005; F16H 2200/0021
See application file for complete search history.

(56) References Cited

U.S. PATENT DOCUMENTS 5,775,449 A * 7/1998 Moroto ................. B60W 10/02
180/65.235
6,958,028 B2 10/2005 Janson et al.
(Continued)

FOREIGN PATENT DOCUMENTS

KR 10-2013-0117184 10/2013
KR 10-2014-0118028 A 10/2014

OTHER PUBLICATIONS

U.S. Appl. No. 16/884,306, filed May 27, 2020.
U.S. Appl. No. 16/884,332, filed May 27, 2020.
U.S. Appl. No. 16/882,299, filed May 22, 2020.

*Primary Examiner* — Charles A Fox
*Assistant Examiner* — Farhana Pervin
(74) *Attorney, Agent, or Firm* — Morgan, Lewis & Bockius LLP

(57) ABSTRACT

A planetary gear set may include a first rotation element fixedly connected to a first shaft, a second rotation element fixedly connected to a second shaft, and a third rotation element fixedly connected to a third shaft; a first motor which is mounted to supply power to the first shaft continuously; and a second motor which is mounted to supply power to the second shaft continuously, and the third shaft is connected to be selectively connectable to a transmission housing, and any two shafts of the first shaft, the second shaft, and the third shaft are configured to constrain rotations thereof to each other.

9 Claims, 3 Drawing Sheets

(56) References Cited

U.S. PATENT DOCUMENTS

| | | | |
|---|---|---|---|
| 7,469,609 B2 | 12/2008 | Baldwin | |
| 8,051,732 B2 | 11/2011 | Gitt | |
| 9,260,109 B2 | 2/2016 | Tanaka | |
| 9,346,462 B2 | 5/2016 | Park | |
| 9,528,583 B2 | 12/2016 | Lubke et al. | |
| 10,081,240 B2 | 9/2018 | Lee et al. | |
| 2002/0088291 A1 | 7/2002 | Bowen | |
| 2003/0100395 A1 | 5/2003 | Hiraiwa | |
| 2005/0204837 A1 | 9/2005 | Janson et al. | |
| 2006/0025272 A1 | 2/2006 | Pelouch | |
| 2007/0149334 A1* | 6/2007 | Holmes | F16H 3/727 475/5 |
| 2008/0108467 A1 | 5/2008 | Hiraki et al. | |
| 2008/0194369 A1 | 8/2008 | Boutou et al. | |
| 2008/0200296 A1 | 8/2008 | Holmes | |
| 2009/0151491 A1 | 6/2009 | Tabata et al. | |
| 2010/0051360 A1 | 3/2010 | Oba et al. | |
| 2010/0160103 A1* | 6/2010 | Holmes | B60K 6/547 475/140 |
| 2011/0184612 A1 | 7/2011 | Fujii et al. | |
| 2012/0316738 A1 | 12/2012 | Teslak et al. | |
| 2015/0068336 A1 | 3/2015 | Peterson | |
| 2016/0167639 A1* | 6/2016 | Hori | B60L 50/51 701/22 |
| 2016/0312857 A1 | 10/2016 | Wechs | |
| 2017/0009862 A1 | 1/2017 | Gumpoldsberger | |
| 2017/0159779 A1 | 6/2017 | Hwang | |
| 2017/0282700 A1 | 10/2017 | Bergquist et al. | |
| 2018/0099561 A1* | 4/2018 | Xu | B60L 15/32 |
| 2019/0118635 A1 | 4/2019 | Hwang | |
| 2020/0047602 A1 | 2/2020 | Chae | |

* cited by examiner

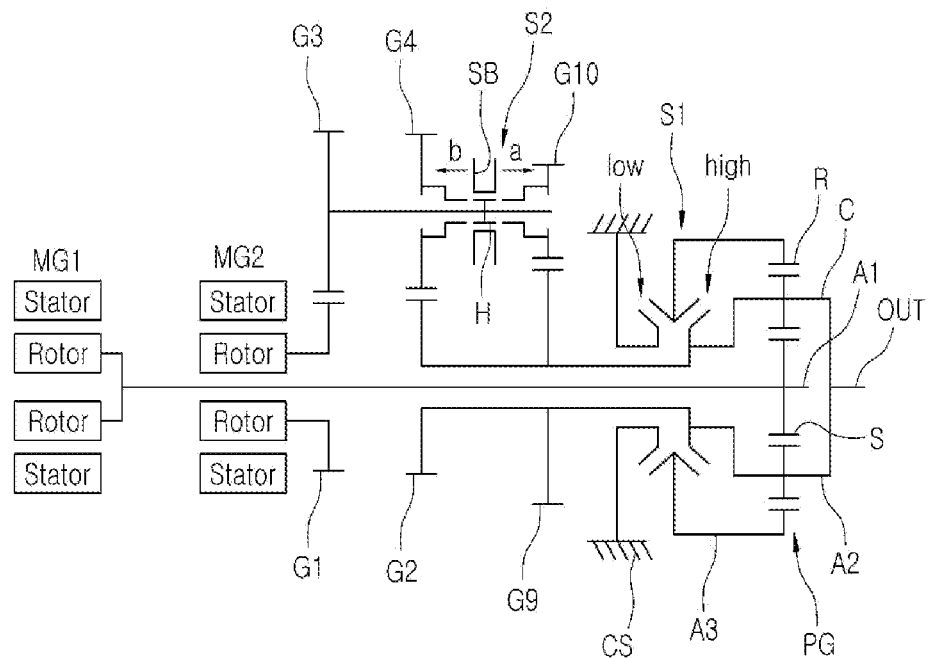

| GEAR STEP | SECOND SHIFT DEVICE | | FIRST SHIFT DEVICE | |
|---|---|---|---|---|
| | a | b | LOW | HIGH |
| 1 | ● | | ● | |
| 2 | | ● | ● | |
| 3 | | ● | | ● |

POWER TRAIN FOR ELECTRIC VEHICLE

CROSS REFERENCE TO RELATED APPLICATION

The present application claims priority to Korean Patent Application No. 10-2020-0035668 filed on Mar. 24, 2020, the entire contents of which is incorporated herein for all purposes by this reference.

BACKGROUND OF THE PRESENT INVENTION

Field of the Invention

The present invention is a technology relating to a power train mounted to an electric vehicle.

Description of Related Art

An electric vehicle is a vehicle which provides a driving force of a vehicle with power of an electric motor, and may contribute greatly to improving environmental pollution in a large city in that there is no exhaust gas.

To popularize the electric vehicle as described above, various technologies need to be improved, but there is a demand for a technology capable of dramatically improving a distance to empty after charging once.

To increase the aforementioned distance to empty, the maximum uphill performance and the highest speed performance required by the vehicle may be required to be satisfied even while improving fuel efficiency (traveling distance per unit power, km/kWh) by reducing the size and capacity of the motor which is mounted to the electric vehicle, and thus to this end, a transmission is mounted thereon.

For the aforementioned reason, the transmission mounted to the electric vehicle does not generate torque interruption, in which the torque transferred to driving wheels is disconnected upon the shift, or shift shock, even while having higher power transfer efficiency with a simple configuration as much as possible.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power train for an electric vehicle, which may satisfy the maximum uphill performance and the highest vehicle speed performance required by a vehicle even while reducing the capacity of a motor by providing a large number of gear ratios, implement high power transfer efficiency with a relatively simple configuration and a small weight, improving fuel efficiency of the vehicle, and prevent torque interruption and shift shock.

A power train for an electric vehicle according to various exemplary embodiments of the present invention for achieving the object is configured to include: a planetary gear set which has a first rotation element of three rotation elements connected to a first shaft, a second rotation element thereof connected to a second shaft, and a third rotation element thereof connected to a third shaft; a first motor which is mounted to supply power to the first shaft continuously; and a second motor which is mounted to supply power to the second shaft continuously, in which the third shaft is selectively connectable to a transmission housing, and any two shafts of the first shaft, the second shaft, and the third shaft are configured to constrain rotations thereof to each other.

The first motor may have a rotation shaft mounted in parallel to the first shaft, and the second motor may have a rotation shaft mounted concentrically with the first shaft.

A first gear may be provided on the rotation shaft of the second motor, a second gear may be provided on the second shaft, and a third gear externally meshed and engaged with the first gear and a fourth gear externally meshed and engaged with the second gear may be concentrically connected to each other.

A fifth gear may be provided on the rotation shaft of the first motor, a sixth gear may be provided on the first shaft, and a seventh gear externally meshed and engaged with the fifth gear and an eighth gear externally meshed and engaged with the sixth gear may be concentrically connected to each other.

The sixth gear may be mounted to a portion where the first shaft extends through the second motor from the planetary gear set.

The first motor may have the rotation shaft directly connected to the first shaft.

The first motor may be positioned at an opposite side of the second motor with respect to the planetary gear set interposed therebetween.

The power train for the electric vehicle may be configured to include a first shifting device which is configured to fix the third rotation element of the planetary gear set to the transmission housing or to connect the third rotation element of the planetary gear set to the second shaft by linear displacement along the axial direction of the first shaft.

Furthermore, a power train for an electric vehicle according to various exemplary embodiments of the present invention for achieving the object is configured to include: a planetary gear set which has a first rotation element fixedly connected to a first shaft, a second rotation element fixedly connected to a second shaft, and a third rotation element fixedly connected to a third shaft; a first motor which is mounted to supply power to the first shaft continuously; and a second motor which is mounted to selectively supply power to the second shaft at different gear ratios, in which the third shaft may be selectively connectable to a transmission housing, and any two shafts of the first shaft, the second shaft, and the third shaft are configured to constrain rotations thereof to each other.

The power train for the electric vehicle may be configured to include a first shifting device which is configured to fix the third rotation element of the planetary gear set to the transmission housing or to connect the third rotation element of the planetary gear set to the second shaft by linear displacement along the axial direction of the first shaft.

The first motor may have a rotation shaft directly connected to the first shaft, and the second motor may have a rotation shaft mounted in parallel to the second shaft.

A first gear may be provided on the rotation shaft of the second motor, a second gear and a ninth gear may be provided on the second shaft, a fourth gear externally meshed and engaged with the second gear and a tenth gear externally meshed and engaged with the ninth gear may be rotatably mounted, respectively, to a rotation shaft of a third gear externally meshed and engaged with the first gear, and a second shifting device may be provided between the fourth gear and the tenth gear.

The second shifting device may be configured to include a hub which is fixedly mounted to the rotation shaft of the third gear and a sleeve slidably mounted on the hub.

The second motor may be mounted concentrically on the second shaft, and the first motor may be directly connected to a portion where the first shaft extends through the second motor from the planetary gear set.

The first motor may be positioned at an opposite side of the second motor with respect to the planetary gear set interposed therebetween.

The present invention may satisfy the maximum uphill performance and the highest vehicle speed performance required by a vehicle even while reducing the capacity of a motor by providing a large number of gear ratios to the electric vehicle, implement high power transfer efficiency with a relatively simple configuration and a small weight, improving fuel efficiency of the vehicle, and prevent torque interruption and shift shock.

BRIEF DESCRIPTION OF THE DRAWINGS

FIG. 3 is a table summarizing operation modes in the various exemplary embodiments of FIG. 1 and the various exemplary embodiments of FIG. 2 in the power train for the electric vehicle according to various exemplary embodiments of the present invention.

FIG. 4 is a diagram illustrating various exemplary embodiments of the power train for the electric vehicle according to various exemplary embodiments of the present invention.

Figure 1:
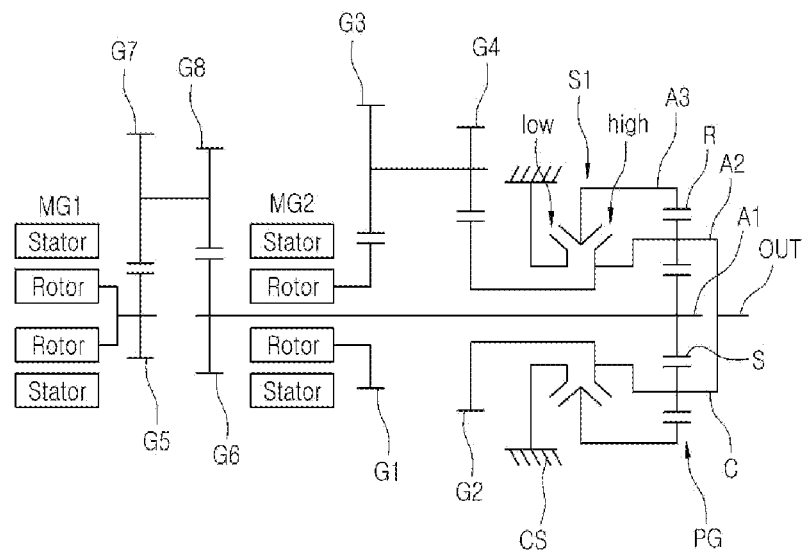
FIG. 1 is diagram illustrating various exemplary embodiments of a power train for an electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
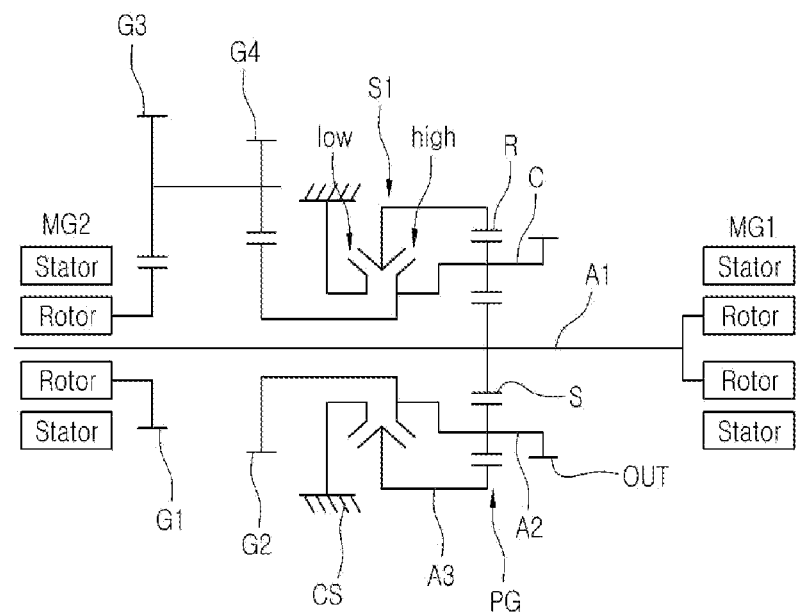
FIG. 2 is a diagram illustrating various exemplary embodiments of the power train for the electric vehicle according to various exemplary embodiments of the present invention.

Referring to FIG. 1 and FIG. 2, the various exemplary embodiments and the various exemplary embodiments of the power train for the electric vehicle according to various exemplary embodiments of the present invention are configured to commonly include a planetary gear set PG which has a first rotation element fixedly connected to a first shaft A1, a second rotation element fixedly connected to a second shaft A2, and a third rotation element fixedly connected to a third shaft A3, among three rotation elements; a first motor MG1 which is mounted to supply power to the first shaft A1 at all times; and a second motor MG2 which is mounted to supply power to the second shaft A2 at all times.

The third shaft A3 is configured to be selectively connectable to a transmission housing CS, and any two shafts of the first shaft A1, the second shaft A2, and the third shaft A3 are configured to constrain rotations thereof to each other.

That is, the planetary gear set PG is provided with a first shifting device S1, in which the first shifting device S1 is configured to fix the third rotation element of the planetary gear set PG to the transmission housing CS or to connect the third rotation element of the planetary gear set PG to the second shaft A2 by the linear displacement along the axial direction thereof.

Accordingly, if the first shaft A1 is regarded as an input shaft receiving power from the first motor MG1, and the second shaft A2 is regarded as an output shaft configured for also taking out the shifted power while receiving power from the second motor MG2, the present invention may be seen as forming a state where the power provided to the input shaft from the first motor MG1 is decelerated by the first shifting device S1 to be output or is output as it is, and as being configured so that the second motor MG2 continuously assists power to the output shaft regardless of the first shifting device S1.

For reference, all of the first shaft A1, the second shaft A2, and the third shaft A3 are mounted concentrically with each other as rotating axes of the rotation elements of the planetary gear set PG, the first rotation element of the planetary gear set PG may be represented as a sun gear S, the second rotation element may be represented as a planet carrier C, and the third rotation element may be represented by a ring gear R.

Furthermore, the 'axial direction' means the direction of the rotating axes of the rotation elements of the planetary gear set PG, and in the drawing, the second shaft A2 is indicated as OUT, and represents configured as an output shaft through which power is taken out.

The first shifting device S1 may include a friction clutch which may switch between a state of connecting the third rotation element of the planetary gear set PG connected to the third shaft A3 to the transmission housing CS and a state of connecting the third rotation element of the planetary gear set PG to the second shaft A2 by forming linear displacement by linearly sliding along the axial direction in a state where the rotation is constrained to the third shaft A3 or the like.

The first motor MG1 has the rotation shaft mounted in parallel to the first shaft A1, and the second motor MG2 has the rotation shaft mounted concentrically with the first shaft A1.

A first gear G1 is provided on the rotation shaft of the second motor MG2, a second gear G2 is provided on the second shaft A2, and a third gear G3 externally meshed and engaged with the first gear G1 and a fourth gear G4 externally meshed and engaged with the second gear G2 are concentrically connected to each other.

Accordingly, the power of the second motor MG2 is transferred to the second shaft A2 through the first gear G1, the third gear G3, the fourth gear G4, and the second gear G2 sequentially, and at the and at the instant time, the power of the second motor MG2 is shifted by the gear ratio between the first gear G1 and the third gear G3 and the gear ratio between the fourth gear G4 and the second gear G2 to be provided to the second shaft A2.

In the various exemplary embodiments of FIG. 1, a fifth gear G5 is provided on the rotation shaft of the first motor MG1, a sixth gear G6 is provided on the first shaft A1, and a seventh gear G7 externally meshed and engaged with the fifth gear G5 and an eighth gear G8 externally meshed and engaged with the sixth gear G6 are concentrically connected to each other.

Accordingly, the power of the first motor MG1 is transferred to the first shaft A1 through the fifth gear G5, the seventh gear G7, the eighth gear G8, and the sixth gear G6 sequentially, and at the and at the instant time, the power of the first motor MG1 is shifted by the gear ratio of the fifth gear G5 and the seventh gear G7 and the gear ratio of the eighth gear G8 and the sixth gear G6 to be provided to the first shaft A1.

In the exemplary embodiment of the present invention, the sixth gear G6 is mounted in a portion where the first shaft A1 extends through the second motor MG2 from the planetary gear set PG.

Accordingly, in an exemplary embodiment of FIG. 1, the power from the first motor MG1 and the second motor MG2 mounted adjacent to each other is transferred to the planetary gear set PG, and thus the output is taken out to the opposite side where the first motor MG1 or the second motor MG2 is positioned with respect to the planetary gear set PG.

FIG. 2 illustrates various exemplary embodiments of the present invention, and other components are the same as those of the various exemplary embodiments of FIG. 1, but the first motor MG1 has the rotation shaft directly connected to the first shaft A1, and is positioned at an opposite side of the second motor MG2 with the planetary gear set PG interposed therebetween.

Accordingly, in the exemplary embodiment of the present invention, when power is supplied from the first motor MG1 and the second motor MG2 which are mounted at both sides of the planetary gear set PG to the central planetary gear set PG, the planetary gear set PG takes out the appropriately shifted power between the first motor MG1 and the second motor MG2.

FIG. 3 is an operation mode table commonly applied to the various exemplary embodiments of FIG. 1 and the various exemplary embodiments of FIG. 2 as described above, and is illustrated to implement a first step and a second step according to the state of the first shifting device S1.

That is, in a state where the first shifting device S1 forms a LOW state to fix the ring gear R of the planetary gear set PG to the transmission housing CS, the power input to the sun gear S from the first motor MG1 is decelerated and output to the planet carrier C to form the first step, and in a state where the first shifting device S1 forms a HIGH state to connect the ring gear R of the planetary gear set PG to the planet carrier C, the power input to the sun gear S from the first motor MG1 is output as it is without shifting to form the second step while all of the rotation elements of the planetary gear set PG are constrained to each other and rotate integrally.

Of course, in the state of the first step and the second step as described above, the second motor MG2 may directly supply power to the output shaft OUT to assist the power by the first motor MG1.

As described above, since the shift between the first step and the second step by the first shifting device S1 may be performed while continuously maintaining a state where the power from the first motor MG1 or the second motor MG2 is transferred to the output shaft OUT, torque interruption does not occur during shifting, securing smooth shifting feeling.

Figures 5, 6:
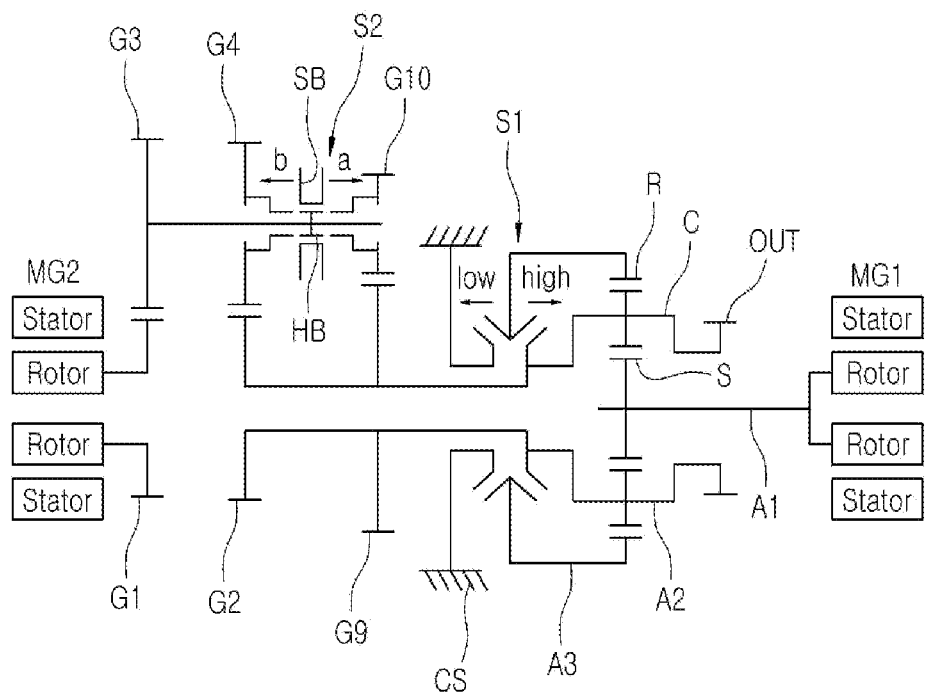
FIG. 5 is a diagram illustrating various exemplary embodiments of the power train for the electric vehicle according to various exemplary embodiments of the present invention.
FIG. 6 is a table summarizing operation modes in the various exemplary embodiments of FIG. 4 and the various exemplary embodiments of FIG. 5 in the power train for the electric vehicle according to various exemplary embodiments of the present invention.

Referring to FIG. 4 and FIG. 5, various exemplary embodiments of the power train for the electric vehicle according to various exemplary embodiments of the present invention are configured to commonly include the planetary gear set PG which has the first rotation element connected to the first shaft A1 of the three rotation elements, the second rotation element connected to the second shaft A2 thereof, and the third rotation element connected to the third shaft A3 thereof; the first motor MG1 which is mounted to supply power to the first shaft A1 at all times; and the second motor MG2 which is mounted to selectively supply power to the second shaft A2 at different gear ratios.

The third shaft A3 is fixed to the transmission housing CS, and any two shafts of the first shaft A1, second shaft A2, and third shaft A3 are configured to constrain rotations thereof to each other.

That is, the various exemplary embodiments of FIG. 4 and the various exemplary embodiments of FIG. 5 are almost the same as the various exemplary embodiments of FIG. 1 and the various exemplary embodiments of FIG. 2 except for a configuration which may selectively supply the power of the second motor MG2 to the second shaft A2 at different gear ratios.

The planetary gear set PG is provided with the first shifting device S1 as in the various exemplary embodiments of FIG. 1 and the various exemplary embodiments of FIG. 2, in which the first shifting device S1 is configured to fix the third rotation element of the planetary gear set PG to the transmission housing CS or to connect the third rotation element of the planetary gear set PG to the second shaft A2 by the linear displacement along the axial direction thereof.

Accordingly, if the first shaft A1 is regarded as the input shaft receiving power from the first motor MG1, and the second shaft A2 is regarded as the output shaft OUT configured for taking out the shifted power while receiving the power from the second motor MG2, the present invention may be seen as forming a state where the power provided to the input shaft from the first motor MG1 is decelerated by the first shifting device S1 to be output or is output as it is, and as being mounted so that the second motor MG2 may selectively supply power to the output shaft OUT by shifting the power at different gear ratios separately from the first shifting device S1.

The first motor MG1 has the rotation shaft directly connected to the first shaft A1, and the second motor MG2 has the rotation shaft mounted in parallel to the second shaft A2.

The first gear G1 is provided on the rotation shaft of the second motor MG2, the second gear G2 and a ninth gear G9 are provided on the second shaft A2, the fourth gear G4 externally meshed and engaged with the second gear G2 and a tenth gear G10 externally meshed and engaged with the ninth gear G9 are rotatably mounted to the rotation shaft of the third gear G3 externally meshed and engaged with the first gear G1, respectively, and a second shifting device S2 is provided between the fourth gear G4 and the tenth gear G10.

The second shifting device S2 is configured to include a hub H and a sleeve SB mounted to the rotation shaft of the third gear G3.

Of course, the fourth gear G4 and the tenth gear G10 are each provided with a clutch gear engaged with the sleeve SB to switch a state where the rotation of the fourth gear G4 is constrained to the rotation shaft of the third gear G3 or the rotation of the tenth gear G10 is constrained to the rotation shaft of the third gear G3 by being engaged with the sleeve SB.

Furthermore, components configuring a conventional synchronous mesh type synchronous device such as a synchronizer ring are mounted between the sleeve SB and the two clutch gears, and the sleeve SB and the clutch gear may be configured to be synchronized and then engaged with each other in advance before the sleeve SB is coupled to each clutch gear.

In FIG. 4 and FIG. 5, the gear ratio formed by the fourth gear G4 and the second gear G2 is configured to be smaller than the gear ratio formed by the tenth gear G10 and the ninth gear G9, and as illustrated in FIG. 6, a state (b) where the sleeve SB of the second shifting device S2 is engaged with the clutch gear of the fourth gear G4 is used to implement the second step and a third step, which are relatively high steps, and a state (a) where the sleeve SB is engaged with the clutch gear of the tenth gear G10 is used to implement the first step which is a relatively low step.

In the various exemplary embodiments of FIG. 4, the second motor MG2 is mounted concentrically on the second shaft A2, and the first motor MG1 is directly connected to a portion where the first shaft A1 extends through the second motor MG2 from the planetary gear set PG.

Accordingly, in an exemplary embodiment of FIG. 3, the power from the first motor MG1 and the second motor MG2 mounted adjacent to each other is transferred to the planetary gear set PG, and thus the output is taken out to the opposite side where the first motor MG1 or the second motor MG2 is positioned with respect to the planetary gear set PG.

FIG. 5 illustrates the various exemplary embodiments of the present invention, and other components are the same as those of the various exemplary embodiments of FIG. 4, but the first motor MG1 is positioned at an opposite side of the second motor MG2 with the planetary gear set PG interposed therebetween.

Accordingly, in the exemplary embodiment of the present invention, when power is supplied from the first motor MG1 and the second motor MG2 which are mounted at both sides of the planetary gear set PG to the central planetary gear set PG, the planetary gear set PG takes out appropriately shifted power between the first motor MG1 and the second motor MG2.

FIG. 6 is an operation mode table commonly applied to the various exemplary embodiments of FIG. 4 and the various exemplary embodiments of FIG. 5 as described above, and is illustrated to implement the first step to the third step according to the states of the first shifting device S1 and the second shifting device S2.

The first shifting device S1 and the second shifting device S2 are configured to independently operate, respectively such that the first shifting device S1 may continuously provide the power of the second motor MG2 to the output shaft OUT when switching between the LOW state of fixing the ring gear R of the planetary gear set PG to the transmission housing CS and the HIGH state of directly connecting the ring gear R of the planetary gear set PG to the planet carrier C, and conversely, when the sleeve SB of the second shifting device S2 is switched between the state in which the sleeve SB is engaged with the clutch gear of the fourth gear G4 and the state in which the sleeve SB is engaged with the clutch gear of the tenth gear G10, the power of the first motor MG1 may be continuously supplied to the output shaft OUT, implementing smooth shifting while preventing torque interruption upon shifting between the first step to the third step as illustrated in FIG. 6.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train for a vehicle, the power train comprising:
    a planetary gear set which has a first rotation element fixedly connected to a first shaft, a second rotation element fixedly connected to a second shaft, and a third rotation element fixedly connected to a third shaft;
    a first motor which is mounted to supply power to the first shaft continuously; and
    a second motor which is mounted to supply power to the second shaft continuously,
    wherein the third shaft is selectively connectable to a transmission housing,
    wherein two shafts among the first shaft, the second shaft, and the third shaft selectively constrain rotations thereof to each other,
    wherein the first motor has a rotation shaft mounted in parallel to the first shaft along a rotation axis of the first shaft,
    wherein the second motor has a rotation shaft mounted concentrically with the first shaft, and wherein the first rotation element, the second rotation element and the third rotation element of the planetary gear set are a sun gear, a planet carrier and a ring gear, respectively.

2. The power train for the vehicle according to claim 1, wherein a first gear is fixedly mounted on the rotation shaft of the second motor,
wherein a second gear is fixedly mounted on the second shaft, and
wherein a third gear gear-engaged with the first gear and a fourth gear gear-engaged with the second gear are fixedly connected to each other.

3. The power train for the vehicle according to claim 1, wherein a fifth gear is fixedly mounted on the rotation shaft of the first motor,
wherein a sixth gear is fixedly mounted on the first shaft, and
wherein a seventh gear gear-engaged with the fifth gear and an eighth gear gear-engaged with the sixth gear are fixedly connected to each other.

4. The power train for the vehicle according to claim 3, wherein the sixth gear is mounted to a portion of the first shaft which extends through the second motor from the planetary gear set.

5. The power train for the vehicle according to claim 4, wherein an output shaft is fixedly connected to the second shaft.

6. The power train for the vehicle according to claim 2, wherein the rotation shaft of the first motor is directly connected to the first shaft.

7. The power train for the vehicle according to claim 6, wherein the first motor is positioned on a portion of the first shaft at an opposite side of the second motor with respect to the planetary gear set interposed between the first motor and the second motor.

8. The power train for the vehicle according to claim 6, wherein an output shaft is fixedly connected to the second shaft.

9. The power train for the vehicle according to claim 1, further including a shifting device which is configured to fix the third rotation element of the planetary gear set to the transmission housing or to connect the third rotation element of the planetary gear set to the second shaft by linear displacement of the shifting device along an axial direction of the first shaft.

\* \* \* \* \*